Feb. 14, 1928.
F. W. WOOD
1,659,180
ELECTRICAL ORDER TELEGRAPH INSTRUMENT
Filed Jan. 26, 1921   3 Sheets-Sheet 1
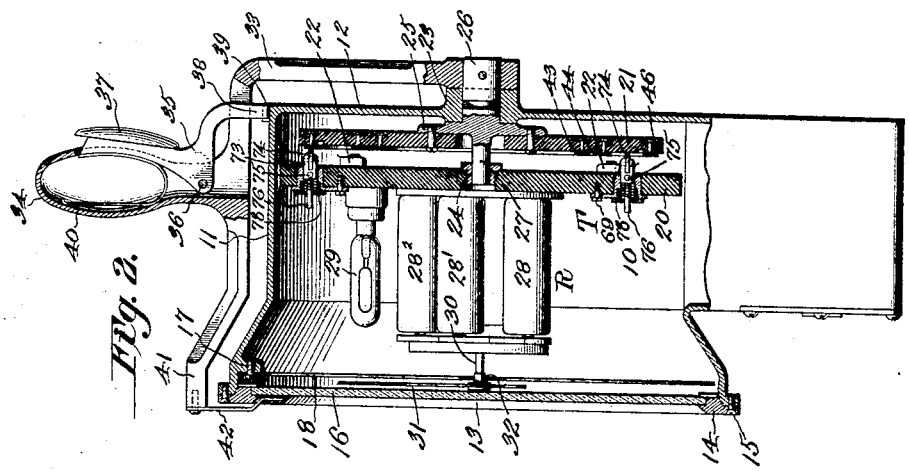
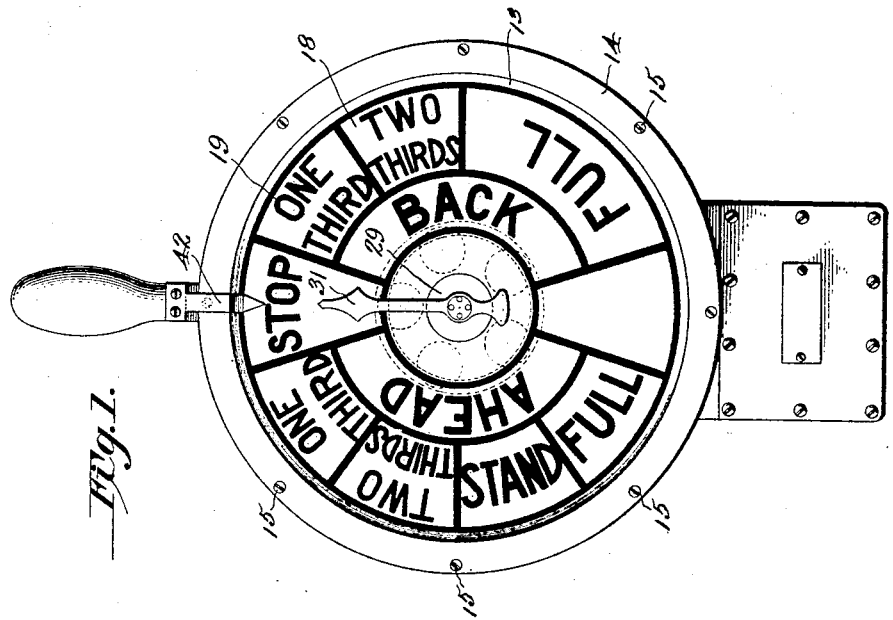
Inventor
Frank W. Wood,
By his Attorneys
Meyers, Cavanagh & Hyde

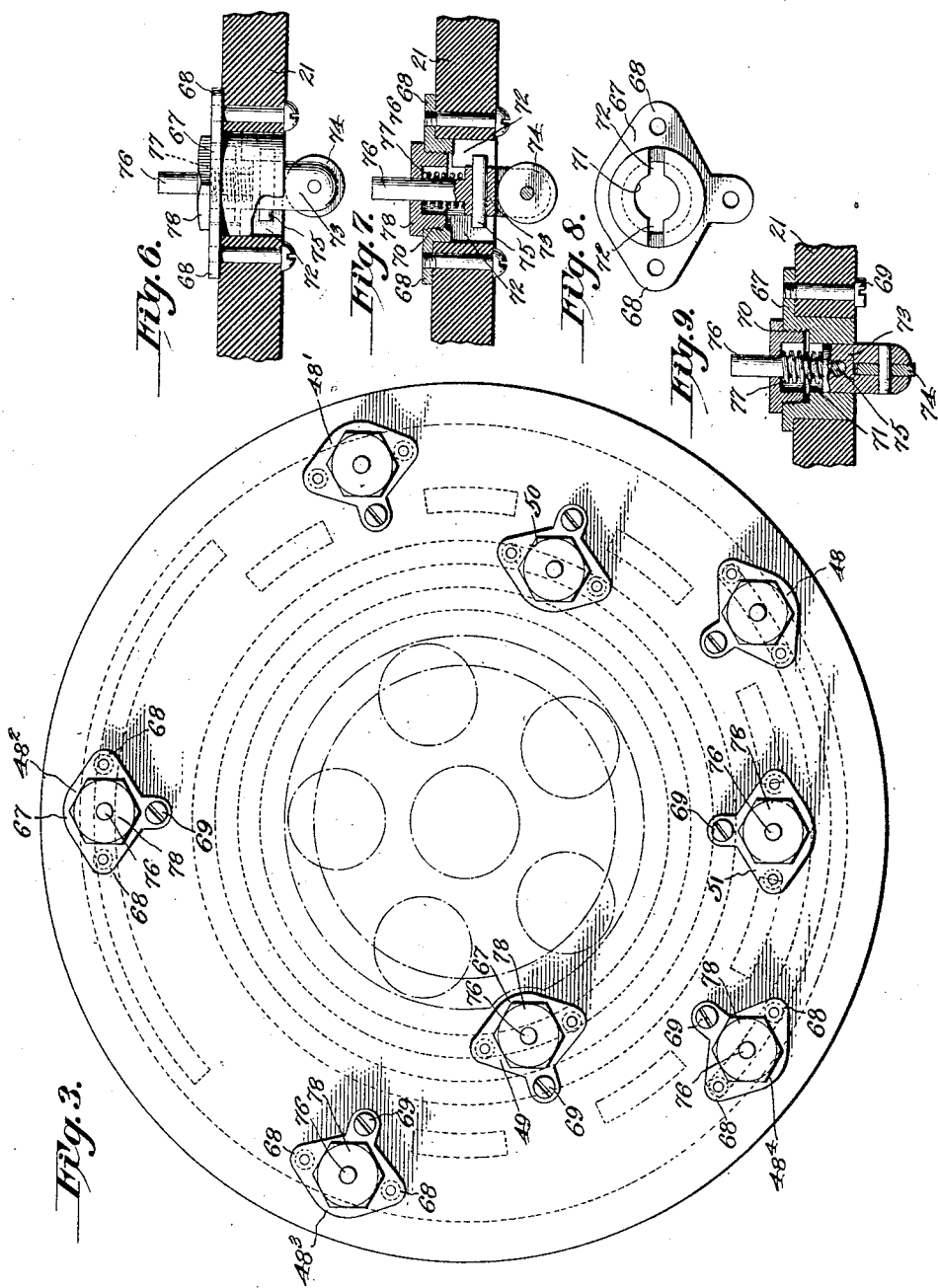

Feb. 14, 1928.
F. W. WOOD
1,659,180
ELECTRICAL ORDER TELEGRAPH INSTRUMENT
Filed Jan. 26, 1921   3 Sheets-Sheet 3
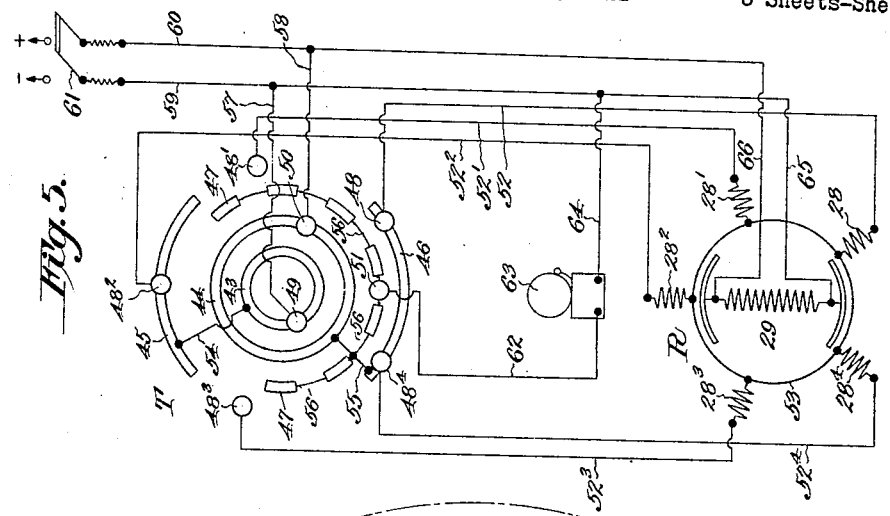
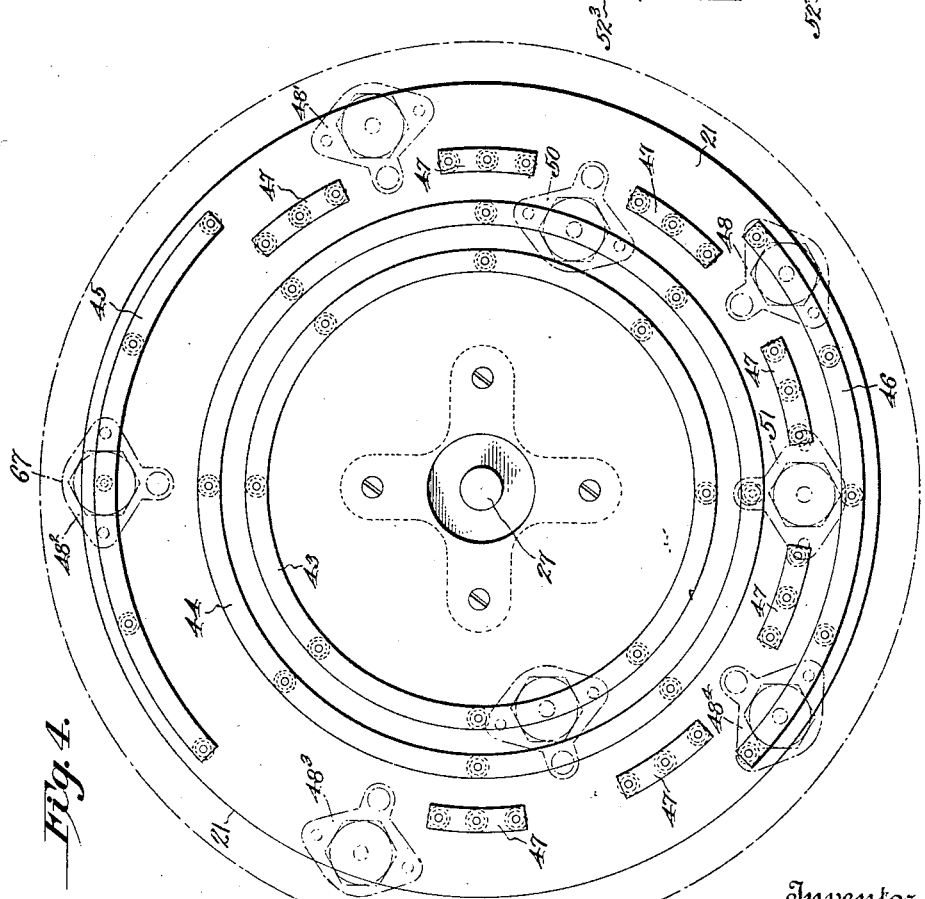
Inventor
Frank W. Wood,
By his Attorneys
Meyers, Cavanagh & Hyde Patented Feb. 14, 1928.

1,659,180

UNITED STATES PATENT OFFICE.

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

ELECTRICAL ORDER TELEGRAPH INSTRUMENT.

Application filed January 26, 1921. Serial No. 439,971.

My present invention relates to an electrical order telegraph instrument and more particularly to an instrument of this type adapted for transmitting and receiving orders, as, for example, for transmitting orders from the bridge of a ship to the engine room and for receiving a return message from the engine room for checking and acknowledging the receipt of such order and has special reference to the provision of an instrument of this type constituting an improvement of the electrical telegraph disclosed in my prior Patent No. 1,216,533 of February 20, 1917.

In my said prior patent I have disclosed a combined transmitting and receiving instrument in which the receiver comprises an electromagnetic motor operated by impulses from a distant station, to the rotor of which motor is affixed an indicating pointer which cooperates with a dial to indicate information received from the said distant station, the transmitter of said combined instrument comprising contact elements arranged circumferentially of said motor and adapted in operation for transmitting impulses to the distant station or stations for conveying information thereto. Such transmitter comprises, more specifically, a series of stationary segments arranged circumferentially and cooperating with a plurality of brushes movable thereover for connecting the segments in a predetermined order across potential lines for transmitting impulses to the motor coils at the distant station to which the segments are attached.

I have found that in an instrument of this type, especially after some period of use, the insulating medium between the segments becomes covered with metallic particles as a result of brush movement thereover, such particles ofttimes resulting in the production of a metallic film on the surface of the insulating material, providing leakage paths between adjacent segments. The surface resistivity of the insulating medium is thus considerably lessened, due to these metallic particles, the small insulation path between adjacent ends of adjacent segments further adding in reducing the surface resistivity and facilitating leakage between the adjacent segments. When one of the segments becomes charged with a potential, leakage across to an adjacent segment results in a partial magnetization of the motor coil connected to said segment, which coil should remain unenergized for the proper actuation of the indicator connected to the motor. To provide an apparatus of this type which shall embody a construction permitting a long insulating path between segments to reduce leakage to a minimum, is a prime desideratum of my present invention.

It has also been found desirable to provide an apparatus in which the elements of the transmitting system may be easily accessible for cleaning and repairing and in which such elements may be repaired or replaced with the least disorganization to the other parts of the apparatus. In use the brushes or the segments of the transmitter become worn or broken and to construct a device in whch repair or replacement of such parts may be effected without dismantling the apparatus as a whole is another prime object of my invention.

The principal objects of my invention therefore involve, in addition to the provisions of a combined transmitting and receiving instrument having the characteristics and performing the functions outlined above, the provisions of an instrument of this type in which the holders for the brushes and segments comprise plates or disks, one of the holders being stationarily mounted and the other being rotatable with respect thereto; the further provision of such an instrument in which the brush elements comprise a series of spaced brushes cooperating with opposed motor segments, such a construction permitting the provision of long leakage paths in the insulating dielectric; the provision of a transmitting instrument in which the brushes are arranged on the stationarily mounted holder, such a construction, furthermore, providing easy accessibility to the brushes from the front of the apparatus for purposes of repair and replacement; the provision of such a transmitting apparatus in which the brushes are separably removable from the holder; the further provision of an apparatus of this nature in which the receiving instrument is mounted on the brush holder, these parts being removable as a unit for purposes of accessibility to the segment holder for cleaning or repair thereof, and the provision of an electrical order telegraph instrument involving simplicity of parts and compactness of arrangement desirable in a device of this type.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention and in which Figure 1 is a front view of my electrical order telegraph, Figure 2 is a side elevational view of the same with parts shown in section, Figure 3 is an enlarged view of the brush holder of the transmitter and the brush layout thereof, showing its association with the segment holder, Figure 4 is an enlarged view of the segment holder showing its association with the brush holder of the transmitter.

Figure 5 is a diagrammatic view of a transmitter at a local station and a receiver at a distant station showing the electrical connections therebetween, and Figures 6 to 9 are detail views of a novel brush element used in my transmitter.

The transmitting system, generally designated by T and the receiving system, generally designated by R, are housed in a casing 10, having preferably cylindrical side walls 11, a rear wall 12 and a removable front wall 13. The front wall comprises preferably an annular member 14 removably mounted on the front of the casing and retained thereon, as by means of retaining elements 15, the said annular member 14 being provided with a window 16 seated in an annular recess thereon. Mounted within the casing and attached thereto, as by bolts 17 and mounted parallel to and adjacent the window 16 is a dial plate 18, which may comprise a translucent plate having thereon opaque characters 19, representing information or orders desired to be conveyed to a distant station, such orders being also received in confirmation from the said distant station.

The transmitting system T, in the present form of my invention, comprises preferably spaced plates or disks 20 and 21 of insulating material, such as hard rubber, phenolic condensation products or composition material, these plates holding a plurality of brush elements and segments to be described more in detail hereinafter, the co-operation of the brush elements and segments resulting in the transmission of impulses to a distant station for conveying information thereto. The holder or plate 20 is preferably stationarily mounted in the casing and is fixedly attached thereto by means of spaced ears or lugs 22, the holder or plate 21 being preferably rotatably mounted in the casing, the casing 12 and the holder 20 providing bearings for the rotatable holder 21. To this end the casing 12 is provided preferably with an integral boss 23 and the holder 20 is provided with a centrally located bushing 24, the rotatable holder 21 being, in turn, provided with a spider element 25 having formed preferably integrally therewith opposed stub shafts 26 and 27, the said stub shafts being journalled in the boss 23 and bushing 24 respectively, to afford the rotatable motion of holder 21 with respect to the holder 20.

The receiving system generally designated by R may comprise the step by step motor shown in my prior Patent No. 1,100,860, patented January 23, 1914, and for purposes of economy of space may preferably comprise the electric indicator disclosed in my copending application No. 316,003, filed August 7, 1919, and includes a series of field coils 28, 28′, 28², etc., to be referred to more in detail hereinafter and includes a rotor 29, which carries a spindle 30, an indicating arm 31 being attached to the spindle 30 for rotation therewith. This receiving system is preferably located centrally of the casing 11 and is centrally mounted on the stationary holder 20 to be removable therewith, the spindle 30 carried by the rotor of the motor having also preferably a bearing 32 on the dial 18.

Means are provided for moving the rotatable holder 21 to transmit information to a distant station, such means comprising an arm 33 fixedly connected at one end to the stub shaft 26 and provided at its upper end with an operating handle 34, adapted to be grasped by the operator in turning the arm 33 and the movable holder connected therewith. For the purpose of locking the arm and the holder in any position about the dial, a clutch lever 35 is provided, fulcrumed on the handle 34, as at 36, one arm of the said clutch lever being provided with an operating button 37, the other arm of the lever being provided with a finger 38 adapted to be received by any one of a series of notches 39, located about the cylindrical wall 11 and formed preferably integrally with the casing 10, a clutch spring 40 being preferably provided for holding the clutch lever 35 in position in any one of the series of notches in which it is positioned. For the purpose of indicating to the operator at the local station the message transmitted to the distant station, the arm 33 is provided with a forward extension 41, a pointer 42 being connected to said extension, the said pointer moving in front of and over the dial 18, indicating to the local operator the message transmitted corresponding to the position of the handle 33 and the corresponding positioning of the rotatable holder 21. The indicating pointer 31, which is attached to the rotor of the receiving instrument, also moves over the dial 18 and indicates to the local operator any message received from the distant station, such message either being an original message or one in confirmation of a previous one sent.

The local transmitter T is adapted for electrical connection to the motor coils of the distant receiving instrument, operation of the local transmitter resulting in the transmission of impulses to the coils of a distant motor, the message transmitted being indicated to the distant operator by the position of the indicating pointer at the distant instrument. As pointed out above, the operator at the distant station may then, by operation of a similar transmitter, transmit a return message in confirmation of the one received, such return transmission operating the local receiver R, the indicator 31 of the local receiver assuming a position over the local dial to inform the local operator of the receipt of the transmitted message and the accuracy of such receipted message.

For the purpose of providing a transmitter which shall embody a construction for minimizing leakage across motor segments and through field coils which at any given time should remain unenergized, I have provided a segment holder of novel arrangement and a novel brush holder comprising a series of brush elements connected to the field coils of the distant motor and cooperating with the motor segments of the transmitter. The segment holder is shown more particularly in Figure 4 of the drawings and comprises the holder 21 hereinbefore referred to provided with two concentrically arranged line rings 43 and 44, adapted for connection to the main lines, the holder being further provided with a plurality of spaced motor segments 45 and 46, comprising preferably in the present form of the invention, two in number, and arranged concentrically with respect to the line rings 43 and 44. Located preferably between the line rings and the motor segments I provide a plurality of buzzer or bell segments 47, adapted, in connection with a brush, for actuating a buzzer or bell for audibly signalling to the distant operator that a message is being transmitted.

Cooperating with this segment holder is the brush holder 20, shown more particularly in Figure 3 of the drawings, the said brush holder being preferably provided with a series of circumferentially spaced motor brushes 48, 48', 48$^2$, 48$^3$ and 48$^4$, the said brush holder being further provided with line brushes 49 and 50 and a brush 51 adapted for cooperation with the bell or buzzer segments 47. The motor segments 45 and 46 are connected respectively across to the line rings 43 and 44, as will appear hereinafter, and are thus continually charged with opposite potentials. These motor segments, where a 10 step switch or transmitting instrument is desired, are of a circumferential length somewhat greater than the circumferential distance between adjacent brushes, as clearly disclosed in Figure 4 of the drawings. Where a 20 step switch or transmitting instrument is desired, these segments would be extended somewhat and would have a length larger than the circumferential distance between adjacent brushes and somewhat smaller than the circumferential distance between alternate brushes, such a 20 step switch being utilizable in connection with a motor of the type disclosed in my co-pending application, Serial No. 262,313, filed November 13, 1918, now Patent No. 1,408,555, dated March 7, 1922. In either event the distance of the dielectric path between adjacent sides of the segments is substantially great, this lengthened dielectric path providing a construction in which leakage across oppositely charged segments is considerably reduced. In the movement of the brushes over the insulating material, metallic particles are deposited over the surface of the insulating material, this increasing the tendency or liability of leakage across from one charged segment to the other. In providing the long dielectric paths afforded by the use of only two segments cooperating with a series of brushes, as herein disclosed, the leakage across the segments and through the motor coils, which at any given time should remain unenergized, is reduced to a minimum, such a construction further permitting the arcing concomitant with the making and breaking of inductive circuits due to the relative movement of brushes and segments, without deterioration of the entire dielectric path between adjacent segments, as was the case in devices of this nature heretofore constructed.

Referring now to the diagrammatic representation of Figure 5 of the drawings, the brushes 48 to 48$^4$ are connected to one terminal of the field coils 28 to 28$^4$ respectively by means of the leads 52, 52', 52$^2$, 52$^3$ and 52$^4$ respectively, the other terminal of each of the field coils being connected to a common ring 53, forming part of the receiver. The segment 45 is connected to the ring 43 by means of the lead 54, the segment 46 being connected to the line ring 45 by means of the lead 55, the series of bell segments 47 being connected together by means of leads 56, one of these leads being connected to the said lead 55. The line brushes 49 and 50 described above are connected by means of leads 57 and 58 respectively to the potential lines 59 and 60 respectively, a switch 61 being preferably provided in the said lines 59 and 60. The brush 51 adapted for cooperating contact with the positively charged bell segments 47 is connected by means of lead 62 to one terminal of the audible signal in the form of a bell or buzzer 63, the other terminal of the bell being connected, as by means of the lead 64, to the line 59 having a negative potential. The armature coils 29 of the receiver are connected by means of the leads 65 and 66 across the main lines 59 and 60 respectively. The brushes on the brush holder 20 are adapted for contact and more specifically for rolling engagement with the segments and rings arranged on the holder 21, as more specifically shown in Figure 2 of the drawings, such cooperation between the brushes and the rings and segments making and breaking circuits for the transmission of impulses from the local transmitter to the distant receiver. It will be observed from Figure 5 that the rings 43 and 44 are charged with opposite potentials by being connected through the leads 57 and 58 across the potential lines 59 and 60, the segments 45 and 46 being in turn charged with opposite potentials by virtue of the connection between the segments and the rings 43 and 44 by means of the leads 54 and 55. In the rotation of the segment holder relative to the brushes, the opposed segments 45 and 46 will cooperate with the brushes 48—$48^4$ in a predetermined order. Thus in the position shown in Figure 5, the circuit may be traced from the positively charged line 60 through the ring 44 to segment 46, the current dividing in passing through brushes 48 and $48^4$ in contact with segment 46, and passing through lines 52 and $52^4$ and through the motor coils 28 and $28^4$ to the common ring 53 and back through a motor coil which is in contact with the other segment 45, such motor coil in the position indicated in Figure 5 being the coil $28^2$ connected by means of lead $52^2$ to brush $48^2$, which is at such time in contact with the segment 45. By this means the coils 28, $28^2$ and $28^4$ are selectively energized for the magnetization of the pole pieces of such coils, such pole pieces cooperating with the pole pieces of the armature coil 29 for the positioning of the indicator 31 of the rotor, the rotor of the armature in the position indicated in Figure 5 corresponding to the position indicated in Figure 1. With the rotation of the segment holder other of the brushes 48 to $48^4$ come into cooperative contact with the opposed segments 45 and 46 for the selective energization of other field coils to effect rotation of the rotor 29, this operation being more specifically disclosed in my prior Patent No. 1,100,860, referred to above. As the segment holder is rotated, the bell segments 47 come into contact with the brush 51, closing the circuit from the positively charged ring 44 through the brush 51, through the lead 62 to one terminal of the audible signal 63 through the said signal and finally through lead 64 to the negative potential line 59.

For the purpose of providing easy accessibility to the brushes for repair, I preferably arrange the brushes on the stationary holder 20 and circumferentially about the receiver mounted on the said stationary holder. In this way the brushes are exposed and may be removed from the front of the apparatus, this construction furthermore embodying the unitary mounting of the receiver on the stationary holder 20, also permitting easy accessibility to the segment holder 21 for the purpose of cleaning and repair of any of the segments or rings thereon. Although this is the preferred arrangement, it is obvious that I may mount the brushes on the movable holder and still secure the advantages of long leakage paths between the segments on the holder. Moreover, although I have shown the holders preferably in plate form to facilitate accessibility to the various parts of the transmitter, it is obvious that in association with the arrangement above provided, long dielectric paths between segments and holders may be made in other than plate form.

For the purpose of providing a device in which any one brush may be repaired or replaced without detaching or dismantling any other part of the device, I provide a construction embodying a brush holder or plate in which the brushes mounted thereon are separably removable from the front of the apparatus. To this end I have provided brushes of a novel type, one of the brushes being shown in detail in Figures 6 to 9 of the drawings. Referring to these figures, the brush holder 20 is bored for the reception of a bushing 67, shown detached in Figure 8 of the drawings, the said bushing being provided with a flange portion 68 attachable to the holder 20 by means of the securing elements, such as bolts 69, the bushings also being provided with a tapped bore 70 and a bore 71 of a diameter somewhat less than the diameter of the tapped bore 70. The said bushing is further milled at its bottom to provide recesses 72 for a purpose to appear presently. The brush element proper comprises a forked post 73 between the forks of which is rotatably mounted roller 74 adapted for rolling contact with the segments or rings on the segment holder 21. The post 73 is preferably circular in cross section and has a diameter fitting the bore 71, a cross pin 75 being inserted in said post and being received by the recesses 72 in the bushing, the coaction of these elements providing a construction for preventing rotation of the brush element 73 in the bushing 67. The brushes are adapted for resilient mounting in the brush holder and to this end the construction includes a reduced portion 76, forming part of the brush post, a spring 77 encircling this reduced portion of the post, the said spring being seated at one end on the post 73 and being urged at the other end against the internal flange of a cap or bolt 78 received by the tapped bore 70. It will be apparent that with this construction the brushes are resiliently mounted for axial movement in the plate holder 20, rotation of such brushes in the holder being prevented for the proper coaction of the brush roller 74 with the segments with which it engages. In the event of wear or breaking of a brush, any of the brushes may be removed by simply unloosening the nut or cap 78 and grasping the reduced portion 76 for the outward movement of the brush element, this removal of the brush element taking place from the front of the apparatus, such brushes being exposed, as clearly disclosed in Figure 2 of the drawings.

The operation and the use of my electrical order telegraph will, in the main, be apparent from the above description thereof. For the transmitting of an order from a local station to a distant station, the operator at the local station grasps the handle 34, simultaneously unlocking the clutch lever 35, and rotates said handle to a position indicated by the pointer 42, such rotation affecting the simultaneous rotation of the segment holder 21 over the stationary brush holder 20. Movement of the rotatable segment holder and the segments and rings thereon selectively energize the field coils of the motor at the distant station, such selective energization or excitation of the field coils resulting in a step by step movement of the rotor at the said distant station and the simultaneous movement of the distant indicator arm 31 attached to the rotor. At the same time the audible signal 63 at the distant station will be actuated, calling attention to the fact that a message is being transmitted. The operator at the distant station, for the purpose of acknowledging the received message and for confirming the particular message received, operates a similar transmitter for the transmission of return impulses to actuate the local transmitter R for the positioning of the local indicator 31, the local operator comparing the positioning of the indicator 31 and the pointer 42 in determining whether the message received at the distant station coincides with the message transmitted by him. For the purpose of illuminating the opaque dial 18, means may be provided, such as lighting means 79, which is preferably mounted on the stationary holder 20, as shown in Figure 2 of the drawings. In the event of necessity for repair or replacement of the brush, the front wall 13 is removed by loosening the series of retaining members 15, the dial 18 being then removed and the exposed brush or brushes 48, etc., may be removed in the manner indicated above. In the event that a segment requires replacement or repair, the holder 20 and the receiver R mounted thereon are removed from the casing 10, the segments on the holder 21 being then exposed for the necessary repairing operation.

It will thus be apparent from the foregoing that I have provided an engine order telegraph system in which the receiver and the transmitter are arranged in a novel and compact manner, in which the elements of the transmitter are constructed of simple parts and arranged in a manner to permit facility of cleaning, replacement and repair, and in which the parts of the transmitter are so structurally related as to substantially eliminate undesirable leakage to segments and through the motor coils.

While I have shown my device in the preferred form, it will be obvious that many changes and modifications may be made in the structure disclosed without departing from the spirit of the invention, defined in the following claims.

I claim:

1. In an electrical order telegraph instrument, a casing open at one face, a receiving and indicating unit located within said casing and substantially centrally thereof, a transmitting system in said casing comprising spaced plates, one of the plates being rotatable and provided with contact segments and the other of the plates being fixed to the casing and provided with cooperating brushes the fixed plate in front of the rotatable plate, and means to removably connect the brushes with the front face of the fixed plate, the receiving unit being mounted on said fixed plate.

2. In an electrical order telegraph instrument, a casing open at one face, a receiving and indicating unit located within said casing and substantially centrally thereof, an order transmitting system in said casing comprising spaced elements, one of the elements being fixed to the casing and provided with brushes arranged concentrically with respect to the receiving unit, the other of the elements being rotatable and provided with contact elements for cooperation with the brushes, and means enabling removal of the brushes at the face of the fixed element remote from the rotary element for detachably connecting said brushes with the fixed element.

3. In an electrical order telegraph instrument, a casing, a receiving and indicating unit located within said casing and substantially centrally thereof, an order transmitting system in said casing comprising spaced elements, one of the elements being fixed to the casing and provided with brushes arranged concentrically with respect to the receiving unit, the other of the elements being rotatable and provided with contact elements for cooperation with the brushes, the concentrically arranged brushes comprising a series of separably removable units, and means for detachably connecting the brushes with the fixed element, said means at the face of the fixed element remote from the rotatable element to enable removal of the brushes from the said face.

4. In an electrical order telegraph instrument, a casing having substantially cylindrical walls, a rear wall and a removable front wall, a receiving and indicating unit located within said casing and substantially centrally thereof, an order transmitting unit located between the receiving unit and the rear wall and comprising segments and cooperating removable brushes, the brushes being arranged concentrically with respect to the receiving unit, each brush being constructed and arranged to be removable from the transmitter in the casing when the casing front wall is removed, and means for detachably connecting the brushes with the fixed element, said means at the face of the fixed element remote from the rotatable element to enable removal of the brushes from the said face.

Signed at New York, in the county of New York and State of New York this 23rd day of January, A. D. 1921.

FRANK W. WOOD.